June 27, 1967 A. L. NIELSEN 3,327,651
APPARATUS FOR MAKING ICE CREAM BARS
Filed Aug. 17, 1964 6 Sheets-Sheet 1

INVENTOR.
ANTON LAMONT NIELSEN
BY Yoshio Katayama
ATTORNEY

June 27, 1967  A. L. NIELSEN  3,327,651
APPARATUS FOR MAKING ICE CREAM BARS
Filed Aug. 17, 1964  6 Sheets-Sheet 2

INVENTOR.
ANTON LAMONT NIELSEN

BY Yoshio Katayama
ATTORNEY

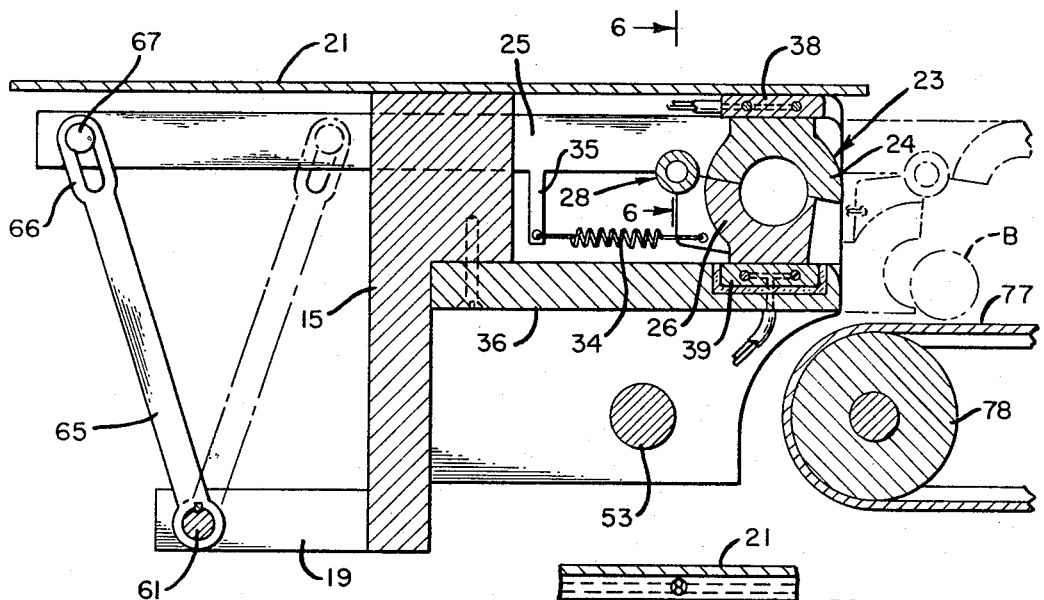
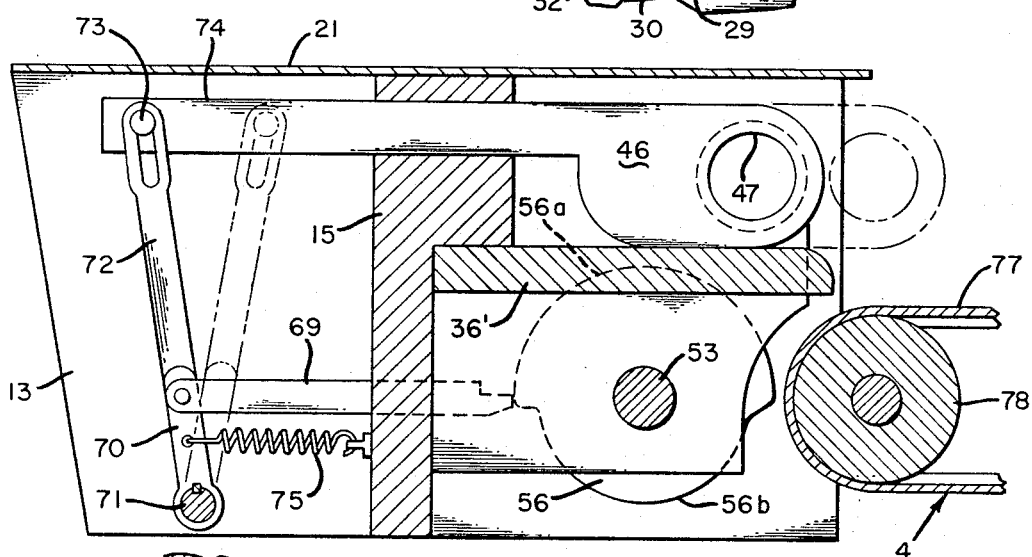
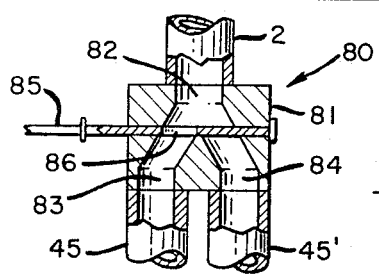
INVENTOR.
ANTON LAMONT NIELSEN
BY Yoshio Katayama
ATTORNEY

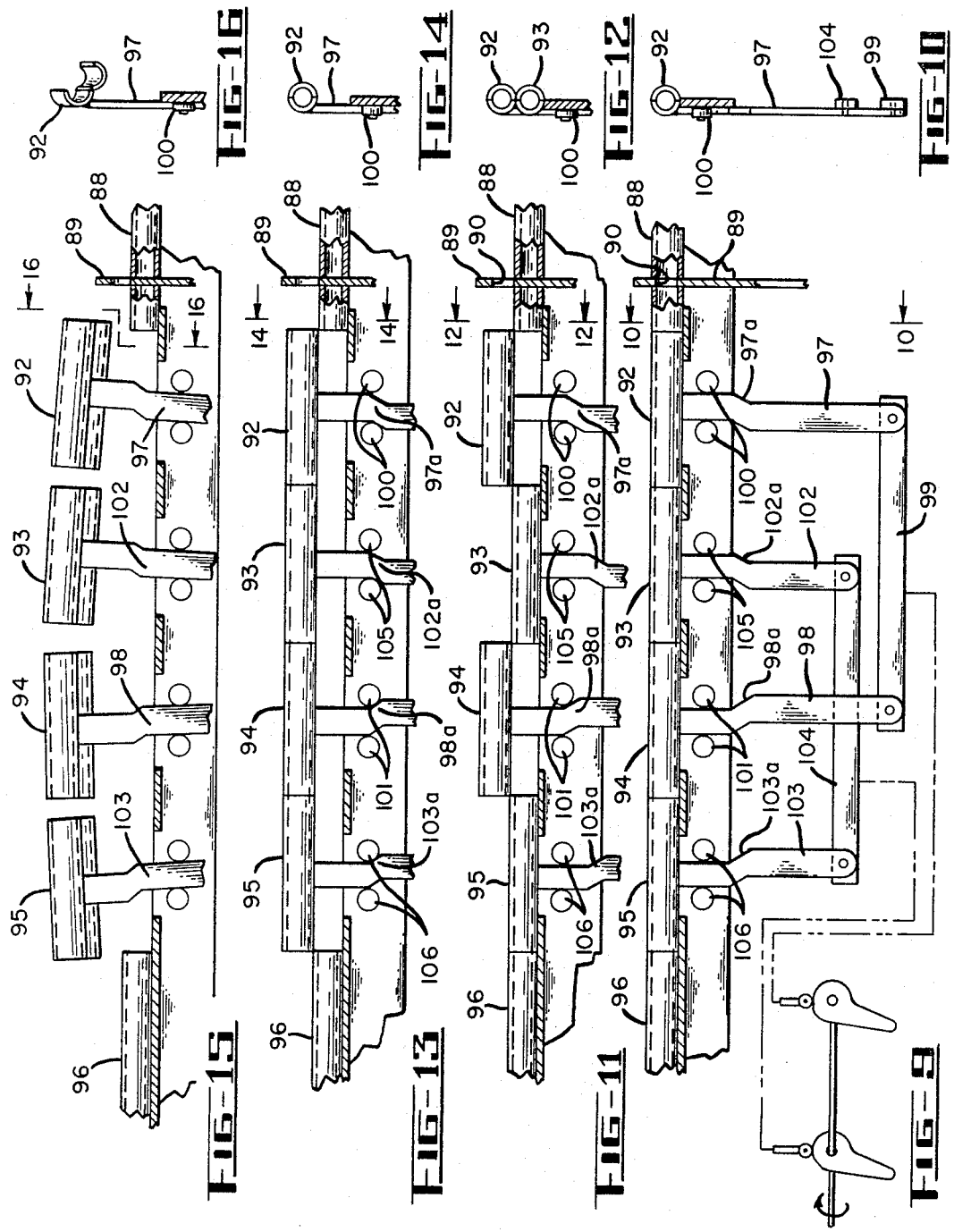

June 27, 1967  A. L. NIELSEN  3,327,651
APPARATUS FOR MAKING ICE CREAM BARS
Filed Aug. 17, 1964  6 Sheets-Sheet 5

INVENTOR.
ANTON LAMONT NIELSEN
BY Joshio Katayama
ATTORNEY

June 27, 1967 A. L. NIELSEN 3,327,651
APPARATUS FOR MAKING ICE CREAM BARS
Filed Aug. 17, 1964 6 Sheets-Sheet 6
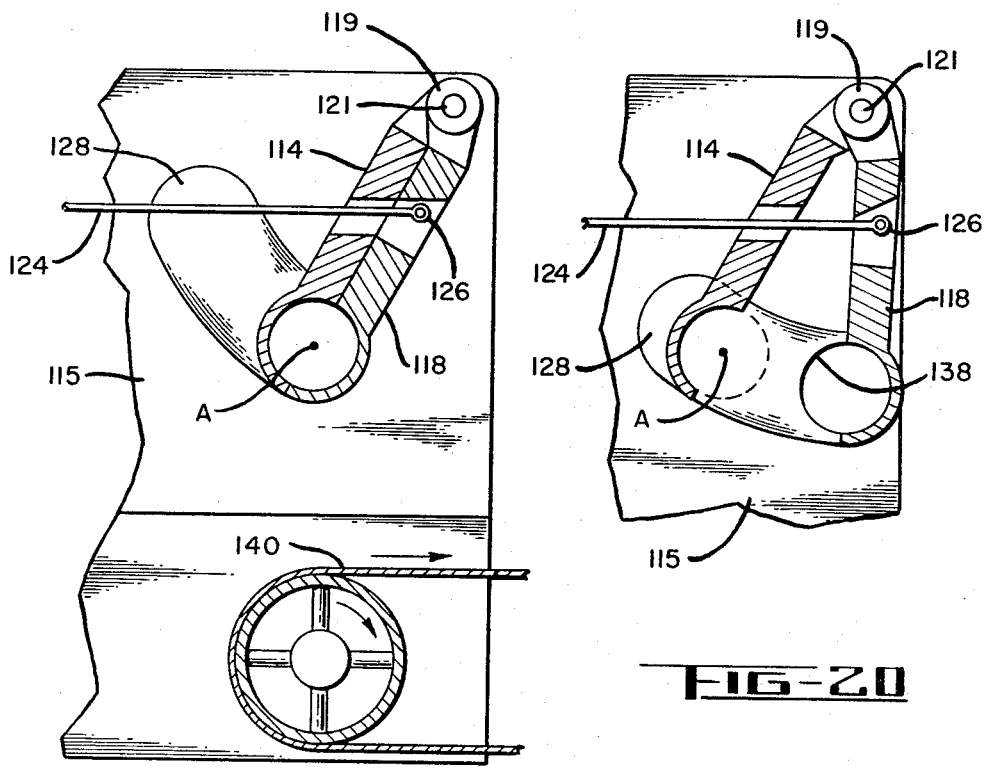
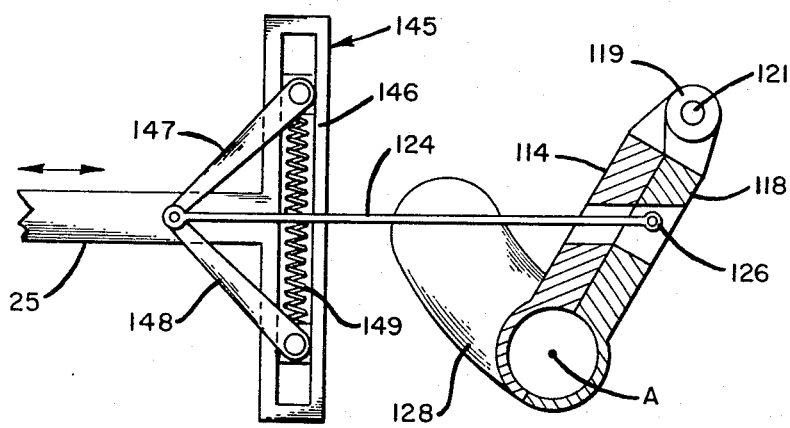
INVENTOR.
ANTON LAMONT NIELSEN
BY *Toshio Katayama*
ATTORNEY United States Patent Office 3,327,651
Patented June 27, 1967

3,327,651
APPARATUS FOR MAKING ICE CREAM BARS
Anton Lamont Nielsen, 2393 East 2900 South,
Salt Lake City, Utah 84109
Filed Aug. 17, 1964, Ser. No. 389,971
9 Claims. (Cl. 107—8)

This invention relates to food processing apparatus, and more particularly to automatic extrusion, cutting and transfer machinery for confections made of semi-solid substances such as soft ice cream, bread or cookie dough and the like.

In accordance with certain teachings of the prior art, automatic machinery for forming bars of ice cream and the like has been proposed wherein one bar is produced for each cycle of machine operation. While the production rate of such machinery is entirely satisfactory to meet consumption demands in many instances, there is an increasing requirement for greater production capacity in a machine of comparable simplicity and cost. The present invention is directed toward the provision of such a machine.

An object of this invention is the provision of apparatus for simultaneously forming a plurality of ice cream bars or the like for each cycle of machine operation.

A further object is the provision of automatic apparatus for simultaneously forming, cutting and ejecting a plurality of confection bars on a transfer or conveyor belt.

Still another object is the provision of such apparatus wherein soft confection batter flows into successive bar forming cavities in a straight line, causing minimum resistance to flow and resulting in rapid filling of the cavities.

In accordance with the invention, an extrusion nozzle connected to a supply of viscous confection batter, such as semi-frozen ice cream is disposed adjacent to and in axial alignment with a plurality of split-shell molds. Reciprocable arms simultaneously move the filled molds transversely of the mold axes so as to sever ice cream in each mold cavity and to eject the bars thus formed to a conveyor. Two multiple-mold machines may be fed alternately from the same ice cream supply machine by means of a cream diverter control operated in synchronism with the machines.

The above and other objects of the invention will become apparent from the following description of preferred embodiments thereof, reference being had to the accompanying drawings in which.

Figure 4:
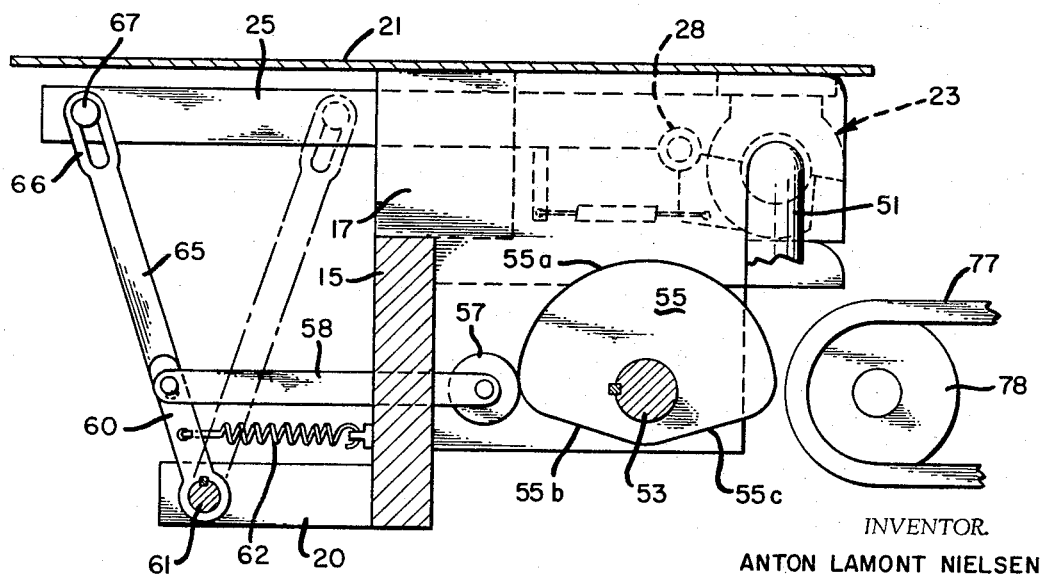
Figure 3:
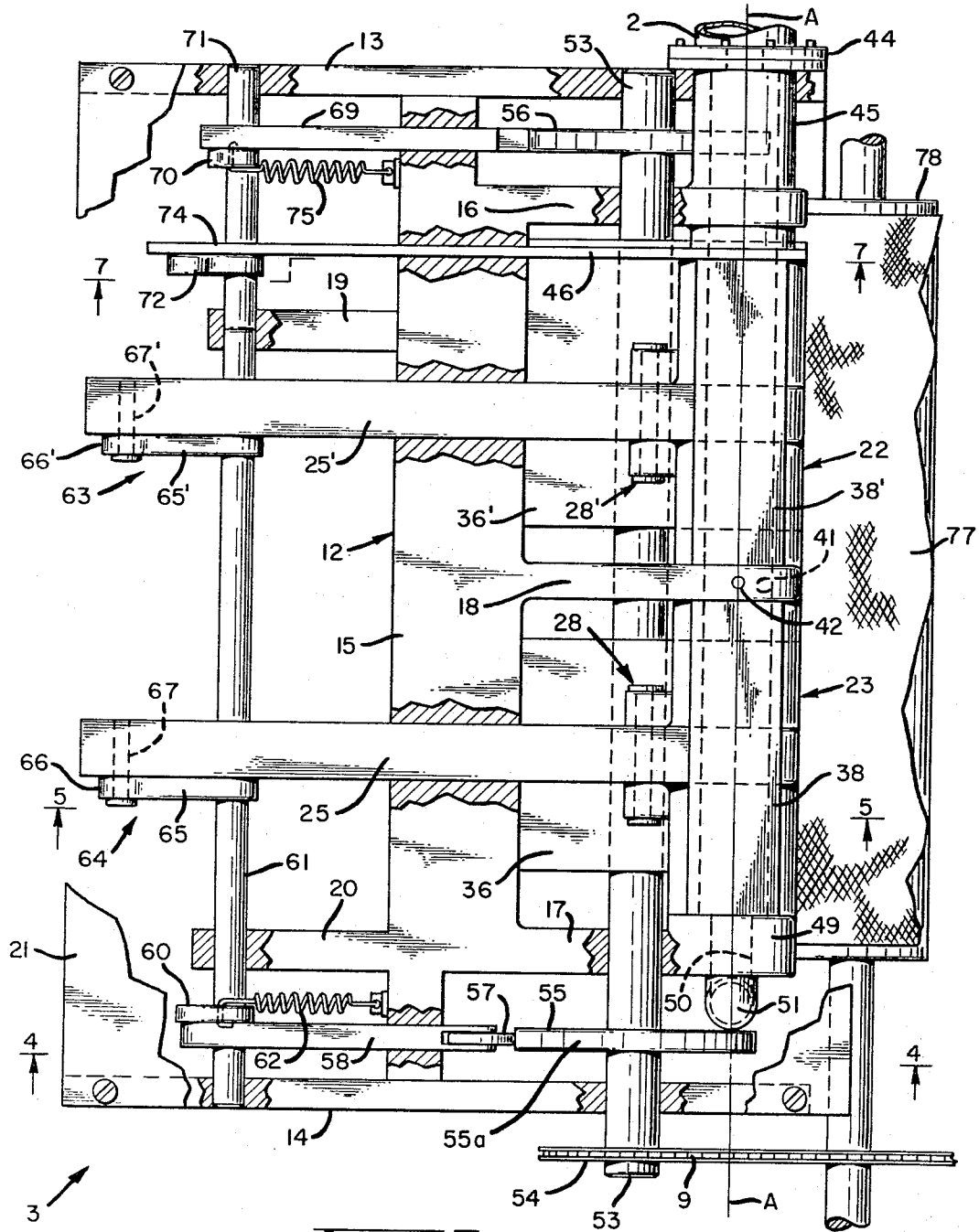
FIGURE 3 is an enlarged top view of one of the bar forming machines with the cover broken away and being partly in section.
Figure 17:
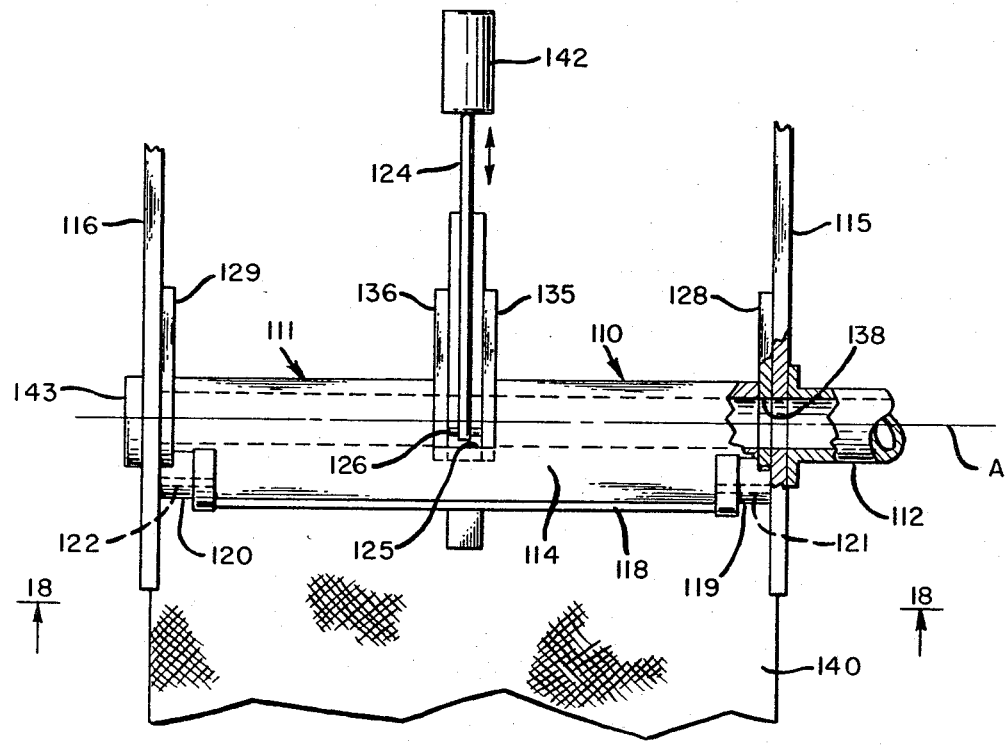
Figure 18:
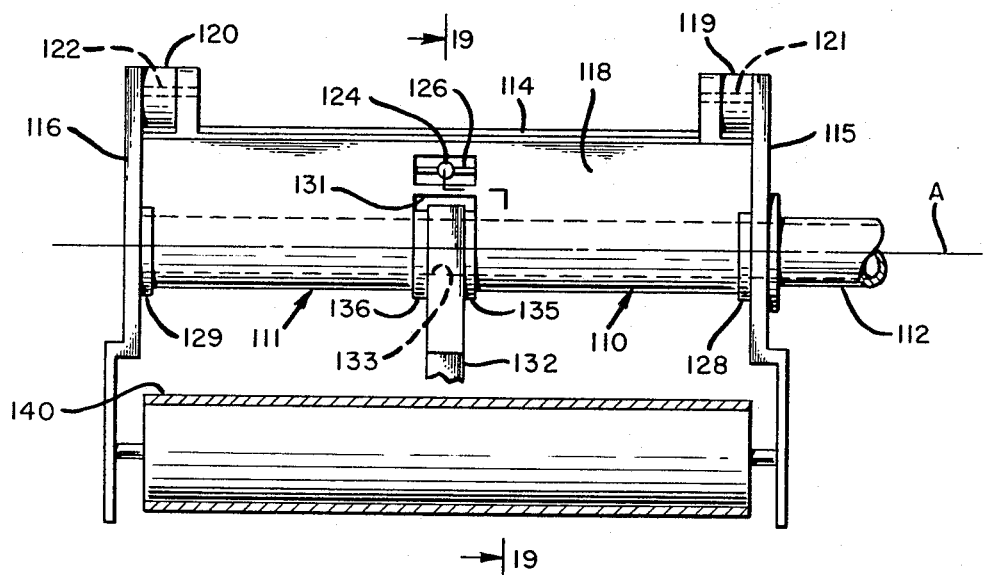

FIGURES 4 and 5 are transverse sections taken on lines 4—4 and 5—5, respectively, of FIGURE 3;

FIGURE 6 is a section taken on 6—6 of FIGURE 5 showing hinge details of the split mold;

FIGURE 7 is a transverse section taken on line 7—7 of FIGURE 3;

FIGURE 8 is a schematic drawing of a cream diverter control for controlling the feed of two bar forming machines from a single supply pipe;

FIGURE 9 is a schematic plan view part of a modified bar forming machine;

FIGURE 10 is a section taken on line 10—10 of FIGURE 9;

FIGURES 11, 13 and 15 are similar to FIGURE 9 and show the mechanism in successive positions during the advance or forward movement;

FIGURES 12, 14 and 16 are sections taken on lines 12—12, 14—14 and 16—16, respectively of FIGURES 11, 13 and 15;

FIGURE 17 is a top view of another modified form of the invention in which the split molds comprise complementary stationary and movable parts;

FIGURE 18 is a front view of the apparatus of FIGURE 17;

FIGURE 19 is a transverse section taken on line 19—19 of FIGURE 18 and showing the mold in the closed position;

FIGURE 20 is a section similar to FIGURE 19 showing the mold in the fully opened position; and FIGURE 21 is a section similar to FIGURE 19 together with a toggle mechanism for opening and closing the molds.

Figure 1:
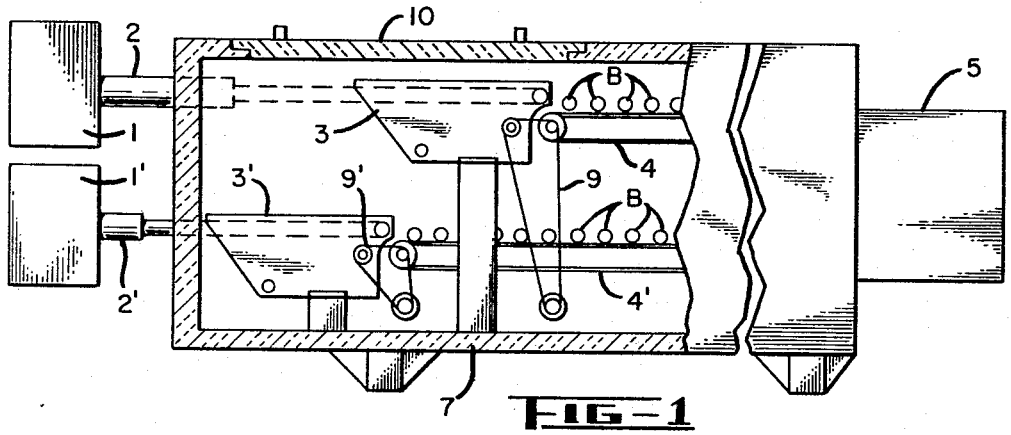
FIGURE 1 is a side elevation of apparatus for making ice cream bars, part of the apparatus being broken away to show the bar forming machines embodying the invention.
Figure 2:
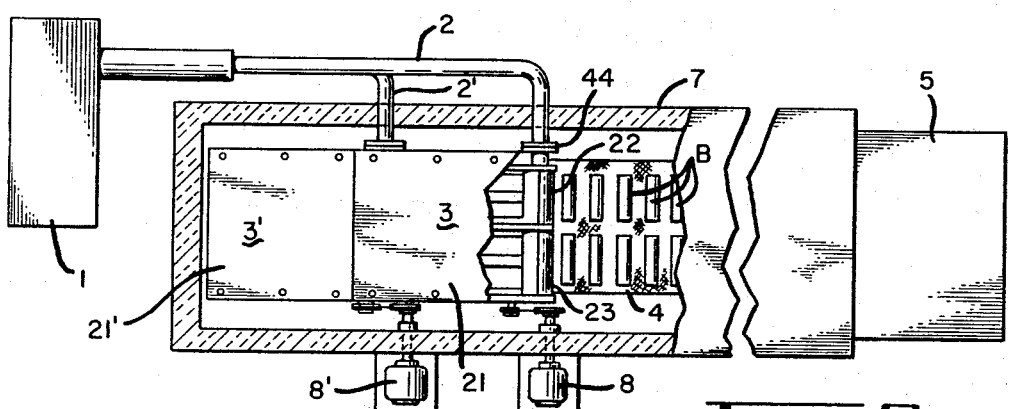
FIGURE 2 is a top view of the apparatus of FIGURE 1 with the cover of part of the apparatus broken away to show construction details.

Referring now to the drawings, apparatus for making ice cream bars or the like shown in FIGURES 1 and 2 comprises a source of ice cream 1 connected by supply pipe 2 to bar forming machine 3 which ejects the bars B to a conveyor 4 for transfer to other processing apparatus 5. The cream is moved through pipe 2 from source 1 to the machine 3 by a pressure means such as a pump, not shown. The bar forming machine 3 and conveyor 4 are housed in freezer unit 7 at a reduced temperature so that the newly formed soft bars on the conveyor may be solidified. A motor 8 mounted outside of the freezer unit connects to a drive chain 9 inside the unit to drive the machine 3 and conveyor 4. Freezer unit 7 preferably is sufficiently large to accommodate two or more bar making systems; a second system identical to that described above and having parts identified by the primes of the reference characters is shown. A cover 10 on the freezer unit permits access to the machines inside.

The bar forming machine 3 comprises a frame 12, see FIGURE 3, having side walls 13 and 14, an interconnecting main center wall 15, forwardly (to the right, as viewed) extending support members 16 and 17 and divider wall 18, and rearwardly (to the left as viewed) support members 19 and 20. A removable cover 21 protects the working parts and provides access to them for cleaning and maintenance.

The ice cream bars are formed within two internally cylindrical split tubular molds 22 and 23 having aligned axes coincident with the ice cream feed axis A of the machine when the molds are retracted as shown in FIGURE 3. The molds are substantially identical in construction and operation, and therefore only one will be described, like reference characters designating like parts on the drawings. Each mold has an upper section 24, see FIGURE 5, permanently and symmetrically secured to a reciprocable bar 25, and a lower section 26 supported by a hinge 28 for pivoting relative to the upper section 24 about an axis parallel to axis A. Hinge 28, see FIGURE 6, comprises a center sleeve 29 secured to bar 25, spaced side sleeves 30 and 31 on the lower mold section, and pivot pin 32 which extends through the sleeves along axis C parallel to axis A. A tension spring 34 secured between the lower section 26 and a projection 35 on bar 25 serves to positively open the split mold when bar 25 moves the mold forwardly as explained below. A plate 36 secured to the center wall 15 of frame 12 extends forwardly under the retracted mold and acts as a cam to close the lower mold section 26.

In order to prevent the semi-frozen cream from sticking to the mold, a heater plate 38 is mounted on the front of the frame 12 so as to engage the upper mold section 24 when the mold is retracted. The lower mold section 26 similarly engages a heater 39 in the top of support plate 36 when the mold is retracted. Each heater carries electric heating elements energized by a suitable power source and capable of warming the mold sections sufficiently that the cream confined in the mold melts at its surface. In addition to facilitating release of the formed bar from the mold, such melting action gives the bar a smoother and less porous surface than is otherwise achievable.

The divider wall 18 against which the inner ends of the two molds 22 and 23 snugly fit, has a cylindrical opening 41 with an axis coincident with axis A and a diameter substantially equal to the internal diameter of each mold. A small air vent hole 42 in wall 18 relieves trapped air when the molds are being filled with cream.

Supply pipe 2 from the source 1 of ice cream is connected by coupling 44, see FIGURE 3, to feed line 45 which is secured to the machine frame. The inner end of feed line 45 is alternately opened and closed by a reciprocable valve plate 46 which extends across and fits snugly against it; plate 46 has an opening 47 which is moved into and out of register with the feed line 45 to open and close it. Plate opening 47, the cavities of molds 22 and 23, and opening 41 in divider wall 18 preferably have the same diameter as the inside of pipe 2. At the opposite end of the machine, a collar 49 having an opening 50 substantially smaller than the mold cavity diameters is mounted on the frame and engages the outer end of mold 23 when the latter is retracted. A spill pipe 51 connected to collar 49 directs any excess cream that flows from the molds to a storage container, not shown, for ultimate return to the system.

The machine has a camshaft 53, see FIGURE 3, journalled in the side walls 13 and 14 and in intermediate parts 16 and 17 of the frame and rotated by motor 8, see FIGURE 3, via chain 9 and a sprocket 54 on the camshaft. Keyed to opposite ends of the camshaft are mold reciprocating cam 55 (FIGURE 4) and valve plate cam 56 (FIGURE 7). The periphery of cam 55 is engaged by roller 57 on one end of follower arm 58, the opposite end of which is loosely connected to crankarm 60 of crankshaft 61. Tension spring 62 connected between crankarm 60 and frame center wall 15 urges roller 57 against cam 55. Approximately 180 degrees of the cam surface, indicated at 55a, is coaxial with camshaft 53; the surface to axis spacing of the next 90 degrees of the cam surface 55b diminishes rapidly to a minimum; and this spacing then increases to a maximum for the final 90 degrees of cam surface 55c. The effect of this cam shape is to position crankarm 60 and crankshaft 61 in the rearward angular position shown in FIGURE 4 during approximately one-half of the rotation of the camshaft 53, to advance the crankarm and crankshaft (clockwise as viewed) to the forward limit of movement during the next quarter of camshaft rotation, and to return the crankarm and crankshaft (counterclockwise rotation) to the rearward limit of movement during the final quarter of camshaft rotation.

Crankshaft 61 is journalled at one end in frame side-wall 14 and at the opposite end in rear support member 19 to the extent of one-half of the thickness of the latter. Intermediate its ends, crankshaft 61 is connected to the reciprocating bars 25 of molds 22 and 23 by substantially identical linkages 63 and 64. Each linkage comprises a crankarm 65 keyed to the crankshaft and connected at its opposite slotted end 66 to a pin 67 on the rear end of bar 25; the later extends through and is supported on center wall 15 for reciprocating movement. As crankshaft 61 oscillates in response to rotation of cam 55, bar 25 reciprocates relative to the frame to successively extend and retract the mold to which it is attached.

Valve plate 46, see FIGURE 7, is alternately advanced to the broken line position and retracted by cam 56 acting through follower arm 69, crankarm 70, crankshaft 71 and crankarm 72 connected by pin 73 to the valve plate extension 74. Spring 75 holds arm 69 against cam 56, the latter having a concentric 180 degrees surface 56 with a diameter larger than its remaining concentric surface 56b.

Conveyor 4 comprises a continuous belt 77 which passes around drums, one of which is shown at 78 adjacent to the bar forming machine. The conveyor belt 77 preferably is advanced at a predetermined rate related to the speed of operation of the bar forming machine, and for this purpose drum 78 and camshaft 53 may be driven at a predetermined relative speed ratio by motor 8 and drive chain 9.

In operation, with cams 55 and 56 in the angular positions shown in FIGURES 4 and 7, semi-frozen ice cream is fed from supply 1 through pipe 2 and into closed molds 22 and 23. The cream fills the molds and when it passes into spill pipe 51, motor 8 is actuated to drive the chain 9 which rotates camshaft 53 in a clockwise direction as viewed as well as the conveyor drum 78. As cam 55 rotates, roller 57 follows cam surface 55b, and both molds 23 and 24 are advanced forward over plates 36 and 36' by the interconnecting linkage including crankshaft 61. At the same time cam 56 rotates causing valve plates 46 to advance forwardly and close the inner end of cream feed line 45. As the molds advance relative to valve plate 46, divider wall 18 and collar 49, the cream is severed at the ends of the molds, and a soft bar is formed in each mold. As the molds continue to advance, each lower mold section 26 passes beyond the front edge of lower plate 36 or 36', permitting spring 34 to pivot that section down and back, opening the mold and ejecting the soft bar B on the belt 77 of the conveyor.

The empty mold is then retracted as roller 57 engages cam surface 55c, and the lower mold section is again cammed up by plate 36 to close the mold. When both molds approach their fully retracted positions, follower 69 rides up on cam surface 56a and retracts valve plate 46 until the opening 47 therein is again aligned with feed line 45 and cream again begins to move successively through the aligned molds to fill them. Any air that may be trapped between the lead end of the new charge of cream and the slug of cream in the divider wall opening 41 is vented through opening 42 in the divider wall. The cycle is then repeated and a succession of pairs of bars B are deposited on the conveyor belt.

If it is desired that two bar forming machines be supplied with a continuous flow of cream from the same supply pipe, a cream diverter control 80 shown in FIGURE 8 may be employed and the machines are operated out of phase with each other so that they are reloaded or recharged with cream at different times with respect to each other. Control 80 comprises a block 81 having a single input passage 82 connected to supply pipe 2 and two output passages 83 and 84 joined to the input passage within the block. The output passages are connected to the input feed lines 45, 45' of two bar forming machines. In order to switch the flow of cream from supply pipe 2 to one or the other of feed lines 45, 45', a control plate 85 with a single opening 86 is disposed across the passages within the block. This plate is adapted to be reciprocated by an appropriate cam at the end of each half-cycle of operation of the machines so that opening 86 registers with the output passage connected to the machine which has its molds retracted to the loading position, and blocks the other. Cream therefore flows substantially continually through pipe 2 and alternately to two machines through feed lines 45 and 45'. The cam which operates control plate 85 preferably is driven by the same mechanism that drives the machines being controlled.

A modified form of the invention is shown in FIGURES 9–16, inclusive, as a plurality of pairs of split-shell molds and associated linkage for forming, severing and ejecting as many confection bars simultaneously. As illustrated in FIGURES 9 and 10, a feed pipe 88 connected to a source of cream or the like is opened and closed by a reciprocable valve plate 89 when opening 90 in the plate is respectively registered with or offset from the pipe. Axially aligned with pipe 88 in retracted positions and in end to end engagement are four split molds 92, 93, 94 and 95 which are substantially identical in construction to molds 22 and 23 described above. An overflow pipe 96 at the end of the row of molds opposite feed pipe 88 directs excess cream to a recovery system. The molds, feed and overflow pipes, and associated drive linkages are mounted in a frame similar to that described above but omitted from the drawings for clarity of illustration.

Molds 92 and 94 are connected to the ends of push bars 97 and 98, respectively, which are pivotally connected to opposite ends of a transverse actuator bar 99. Bars 97 and 98 are formed with oppositely extending diagonal steps 97a and 98a, respectively, spaced from the molds by a distance slightly greater than the outside diameters of the molds and feed pipe, and are guided by pairs of rollers 100 and 101 which engage opposite sides of the bars. Similarly, molds 93 and 95 are connected to push bars 102 and 103, respectively, pivotally connected to opposite ends of a transverse actuator bar 104. Bars 102 and 103 have opposed diagonal steps 102a and 103a, respectively, similarly spaced from the molds, and are guided by pairs 105 and 106 of side rollers. Actuator bars 99 and 104 are moved independently of each other in a direction transverse to the retracted mold axes by suitable mechanism similar to the cam and crank linkages described heretofore.

In operation, the four molds 92–95, inclusive, in the closed and retracted position shown in FIGURES 9 and 10, are filled with semi-frozen ice cream passing through feed pipe 88 and the opening 90 in valve plate 89. After plate 89 is shifted to close pipe 88, a drive mechanism acting on actuator bar 99 advances molds 92 and 94 out of alignment with molds 93 and 95 until bar steps 97a and 98a are adjacent to rollers 100 and 101, respectively, thus severing or shearing the cream bars in molds 92, 93 and 94 and at the inner edge of mold 95, see FIGURES 11 and 12. Next, molds 93 and 95 are advanced in the same direction by drive means acting through actuator bar 104 until the four molds are again in substantial alignment as shown in FIGURES 13 and 14, and the steps 102a and 103a on bars 102 and 103, respectively, are adjacent to rollers 105 and 106, respectively.

Actuator bars 99 and 104 are then moved together on the final portion of the forward or advance stroke. The steps on four push bars traverse the respective guide rollers during this movement and cause the molds to separate from each other as they approach the limit of their advance as shown in FIGURES 15 and 16. Simultaneously each split mold opens and ejects a cream bar to a conveyor. Thereafter the molds are returned to their initial position and are ready for another cycle of operation.

The modified form of the invention illustrated in FIGURES 17–21, inclusive, includes split molds 110 and 111 having cavities with aligned axes coincident with axis A of feed pipe 112. Molds 110 and 111 comprise a stationary plate 114 which is supported in fixed position on frame members 115 and 116, and movable plate 118 is pivotally supported at opposite ends by hubs 119 and 120 on pins 121 and 122, respectively, for movement relative to stationary plate 114 transversely of axis A. Pivotal movement of movable plate 118 is controlled by reciprocable rod 124 which extends through a central recess 125 in stationary plate 114 to a connection with the central part of the movable plate via pin 126; movement of rod 124 to the right as viewed in FIGURE 17 causes plate 118 to pivot outwardly from stationary plate 114 to open the molds as shown in FIGURE 20, and opposite movement of rod 124 causes plate 118 to pivot against plate 114 to close the molds.

In order to sever the ends of the ice cream filling the mold cavities, thus forming the ice cream bars, apertured cutter plates 128 and 129 are secured to the ends of movable plate 118 and extend transversely to feed axis A between the ends of stationary plate 114 and frame members 115 and 116, respectively. The central part of movable plate 118 has a recess 131 (see FIGURE 18) aligned with recess 125 in plate 114, and central wall 132 of the machine frame extends into recesses 125 and 131 transversely of cavity axis A; wall 132 has an aperture 133 with a diameter equal to the diameter of each mold cavity. Apertured cutter plates 135 and 136, corresponding to plates 128 and 129, are secured to the sides of movable plate recess 131 and extend within stationary plate recess 125 adjacent to opposite sides of wall 132 transversely of cavity feed axis A. The apertures in plates 128, 129, 135 and 136 (one of which apertures is shown at 138 in FIGURES 17 and 20) have diameters equal to the diameters of the cavities. When movable plate 118 is in the "mold closed" position, the axes of the apertures in the cutter plates are coincident with axis A, and both molds 110 and 111 may be filled with cream from feed pipe 112. When plate 118 is moved to the "mold open" position, the apertures in the cutter plates are displaced from axis A and the solid portions of these plates traverse the feed axis to cut the cream filler. The solid portion of plate 128 additionally acts as a gate to close off the flow of cream from pipe 112 when the molds are opened.

In operation, plates 114 and 118 abut against each other as shown in FIGURE 19 (the "mold closed" position) while cream from pipe 112 is forced seriatim into molds 110 and 111. When both molds are filled, bar 124 is actuated to pivotally displace movable plate 118 to the "mold open" position shown in FIGURE 20, causing cutter plates 128, 129, 135 and 136 to sever the bars and permitting the two ice cream bars to fall by gravity to conveyor belt 140. Bar 124 then returns to its original position and closes the molds preparatory to beginning another cycle of operation. The molds are heated by suitable heater rods (not shown) to prevent sticking of the cream to the mold surfaces.

Rod 124 may be actuated to open and close the molds by a solenoid 142, see FIGURE 17, energized in response to pressure of the filling cream against a pressure switch 143 on frame member 116 aligned with axis A. Alternatively, the conveyor drive mechanism described above in conjunction with FIGURES 1–3 may be utilized by coupling bar 25 (see FIGURE 3) to bar 124 through a toggle mechanism 145 as shown in FIGURE 21. As bar 25 moves to the left as viewed in the drawings, toggle frame 146 attached thereto moves in the same direction until toggle arms 147 and 148 are vertically aligned; thereafter, tension spring 149 pulls the remote ends of the toggle arms toward each other causing bar 124 to move rapidly to the right as viewed to open the molds. The molds are snapped closed by reverse actuation of bar 25.

Changes and modifications may be made to the above described embodiments of the invention without departing from the spirit of the invention. The appended claims therefore define the scope of the invention. It will be understood that my invention may be practiced in forming confections other than ice cream bars, and that different shapes of molds may be employed to produce confections having different shapes and sizes.

I claim:
1. Apparatus for making ice cream bars comprising
   a source of ice cream,
   a conveyor,
   a bar forming machine having a frame and a plurality of substantially identical open-ended tubular split molds movable between a retracted position with the open ends of the molds aligned symmetrically along a common axis and an extended position over said conveyor,
   means for reciprocating said molds transversely of said common axis between said positions, an ice cream supply pipe connected between said source and said frame for feeding ice cream to said molds when aligned along said common axis, valve means on said supply pipe for controlling said feeding of ice cream to said molds, means for actuating said valve means to permit the flow of ice cream from said pipe to said aligned molds while aligned along said common axis and to block the flow of ice cream when said molds are not aligned along said common axis, each mold comprising sections pivotally connected together for opening and closing the mold, means for closing each mold when the molds are aligned along said common axis, and means for opening each mold when the molds are extended over said conveyor.

2. Apparatus according to claim 1 in which said means for reciprocating for the molds comprises substantially identical linkage means whereby said molds move simultaneously during each cycle of operation.

3. Apparatus according to claim 1 in which said mold reciprocating means comprises at least two independently movable linkage means for moving at least two molds independently during each cycle of operation.

4. Apparatus according to claim 1 in combination with at least one other substantially identical bar forming machine and a cream diverter control connected to said supply pipe for diverting cream to the molds of said machines, and diverter control operating means synchronized with said mold reciprocating means for diverting the flow of cream successively to said machines when the molds thereof are in retracted positions.

5. Apparatus for making bar-like confections comprising
 a source of soft confection substance,
 a confection forming machine having a frame,
 a supply pipe connected between said source and said frame for feeding confection substance into the machine along a straight axis,
 a conveyor adjacent to said machine having a belt adapted to travel away from the machine in a direction extending transversely of the feed axis,
 a plurality of tubular molds supported within said frame,
 each mold having an axis and an upper section and a lower section hinged together for relative pivotal movement about an axis parallel to the mold axis,
 spring means associated with each mold urging said sections apart,
 means for reciprocating said molds between retracted positions within the frame with the mold axes coincident with the feed axis and extended positions with the molds disposed over said conveyor belt comprising
  elongated bars secured to the upper sections, respectively, of the molds and extending transversely of the mold axes oppositely from said conveyor,
  each bar being slidably supported on said frame for movement transversely of the feed axis, and
  a first cam operatively connected to said bars and shaped to induce reciprocation of the bars;
 a valve plate supported on said frame for reciprocal movement across the supply pipe for opening and closing said pipe to control the feed of confection substance,
 a second cam operatively connected to said valve plate to control movement of the latter,
 means for rotating said first and second cams synchronously whereby the supply pipe is open when the molds are in their retracted positions and the pipe is closed at other times in the cycle of operation,
 a plate engageable with the lower section of each mold for supporting the lower section against the upper section to close the mold when the latter is in the retracted position,
 each mold in its extended position projecting beyond said plate whereby the spring means causes the lower section to pivot away from the upper section.

6. Apparatus according to claim 5 with electric heater means for warming said molds.

7. Apparatus according to claim 5 in which each mold in its retracted position is juxtaposed to stationary parts of the frame whereby the confection substance within the mold is severed at the ends of the mold when the latter moves from the retracted position toward the extended position.

8. Apparatus according to claim 5 in which each of said molds in the retracted position is disposed adjacent to at least one of the other molds, adjacent molds being movable relative to each other transversely of the feed axis whereby to sever the confection substance between said adjacent molds.

9. Apparatus according to claim 8 in which each of said elongated bars has a diagonal step spaced from the mold by a distance not less than the transverse external dimension of the mold, and a pair of guide rollers mounted on the frame on opposite sides of each bar for engaging said step and moving the mold laterally from the adjacent mold.

References Cited
UNITED STATES PATENTS
| | | | |
|---|---|---|---|
| 1,685,250 | 9/1928 | Key | 107—8.5 |
| 1,989,272 | 1/1935 | England et al. | 107—1.1 |
| 3,234,585 | 2/1966 | Snyder | 17—1 |

FOREIGN PATENTS
| | | |
|---|---|---|
| 343,756 | 11/1921 | Germany. |

WALTER A. SCHEEL, *Primary Examiner.*

J. SHEA, *Assistant Examiner.*